US011194601B2

(12) United States Patent
Nalepa et al.

(10) Patent No.: US 11,194,601 B2
(45) Date of Patent: Dec. 7, 2021

(54) DYNAMIC INTEGRATION CHECKLIST FOR DEVELOPMENT PLATFORM

(71) Applicant: Microsoft Technology Licensing, LLC, Redmond, WA (US)

(72) Inventors: Lesia Nalepa, Seattle, WA (US); Benjamin R. Vincent, Kirkland, WA (US); Arielle Dorothy Crowe, Munster, IN (US); Jeffrey Thomas Sakowicz, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/743,774

(22) Filed: Jan. 15, 2020

(65) Prior Publication Data

US 2021/0200564 A1 Jul. 1, 2021

Related U.S. Application Data

(60) Provisional application No. 62/955,852, filed on Dec. 31, 2019.

(51) Int. Cl.
*G06F 8/60* (2018.01)
*G06F 9/451* (2018.01)
*G06F 16/955* (2019.01)
*G06F 8/70* (2018.01)

(52) U.S. Cl.
CPC .............. *G06F 9/453* (2018.02); *G06F 8/60* (2013.01); *G06F 8/70* (2013.01); *G06F 16/955* (2019.01)

(58) Field of Classification Search
CPC ...... G06F 8/10; G06F 8/33; G06F 8/34; G06F 8/38; G06F 8/60; G06F 16/95; G06F 9/453
See application file for complete search history.

(56) References Cited

U.S. PATENT DOCUMENTS 6,342,907 B1* 1/2002 Petty ..................... G06F 8/10
715/708
6,748,582 B1* 6/2004 Chiles ................... G06F 8/30
717/101

(Continued)

OTHER PUBLICATIONS

"Azure AD Conditional Access Documentation", Retrieved from: https://web.archive.org/web/20190324011536/https://docs.microsoft.com/en-US/azure/active-directory/conditional-access/, Retrieved Date: Mar. 24, 2019, 02 Pages.

(Continued)

*Primary Examiner* — Alvin H Tan
(74) *Attorney, Agent, or Firm* — Schwegman Lundberg & Woessner, P.A.

(57) ABSTRACT

Generally discussed herein are devices, systems, and methods for guiding a user through a cloud application creation or deployment process using a development platform, the method performed by a checklist engine, the method comprising receiving, from the development platform, application data indicating a state of the cloud application, determining, based on the application data, that an item of a checklist has been completed, the checklist indicating tasks to be performed for configuring and securing the cloud application for deployment, storing data indicating the completed item is completed in a checklist data database, and causing a view of the checklist to be provided on a display.

18 Claims, 7 Drawing Sheets

(56) References Cited

U.S. PATENT DOCUMENTS

| | | | | |
|---|---|---|---|---|
| 7,159,206 | B1* | 1/2007 | Sadhu | G06Q 10/06 |
| | | | | 717/101 |
| 7,219,327 | B1* | 5/2007 | Jacobs | G06F 8/10 |
| | | | | 717/104 |
| 7,596,620 | B1* | 9/2009 | Colton | G06F 8/10 |
| | | | | 709/201 |
| 8,261,231 | B1* | 9/2012 | Hirsch | G06F 8/20 |
| | | | | 709/201 |
| 9,712,604 | B2* | 7/2017 | Sinha | G06F 9/00 |
| 9,760,343 | B2* | 9/2017 | Noens | G06F 8/30 |
| 9,772,862 | B2* | 9/2017 | Wunderlich, Jr. | G06F 8/36 |
| 10,140,191 | B2* | 11/2018 | Kaulgud | G06F 8/60 |
| 10,606,576 | B1* | 3/2020 | Tung | H04L 63/104 |
| 10,740,469 | B2* | 8/2020 | Zheng | G06Q 10/06311 |
| 10,749,985 | B2* | 8/2020 | Kapila | H04L 67/34 |
| 2003/0182656 | A1 | 9/2003 | Leathers et al. | |
| 2008/0221964 | A1* | 9/2008 | Berkovitz | G06Q 10/10 |
| | | | | 705/80 |
| 2011/0145790 | A1 | 6/2011 | Rajaraman et al. | |
| 2017/0289060 | A1* | 10/2017 | Aftab | H04L 41/5054 |
| 2021/0132930 | A1* | 5/2021 | Govindaraju | G06F 9/5072 |

OTHER PUBLICATIONS

"Integrate Microsoft Identity and the Microsoft Graph into a Xamarin forms App using MSAL", Retrieved from: https://web.archive.org/web/20190421212422/https://github.com/Azure-Samples/active-directory-xamarin-native-v2, Retrieved Date: Apr. 21, 2019, 07 Pages.
"Microsoft Graph", Retrieved from: https://developer.microsoft.com/en-US/graph, Retrieved Date: Mar. 2, 2020, 05 Pages.
"Microsoft Graph Documentation", Retrieved from: https://web.archive.org/web/20190415211953/https://docs.microsoft.com/en-US/graph/, Retrieved Date: Apr. 15, 2019, 03 Pages.
"Microsoft Identity Platform for Developers Terms of Use", Retrieved from: https://docs.microsoft.com/en-US/legal/microsoft-identity-platform/terms-of-use, Retrieved Date: Mar. 2, 2020, 09 Pages.
"Performing Single Sign Out of All Web Apps using Azure AD", Retrieved from: https://web.archive.org/web/20180604122010/https://github.com/Azure-Sampies/active-directory-dotnet-web-single-sign-out, Retrieved Date Jun. 4, 2018, 03 Pages.
Baldwin, et al., "Azure Key Vault Basic Concepts", Retrieved from: https://docs.microsoft.com/en-US/azure/key-vault/basic-concepts, Jan. 18, 2019, 05 Pages.
Brenck, et al., "An ASP.NET Core Web App Signing-in Users with the Microsoft Identity Platform in Your Organization", Retrieved from: https://github.com/Azure-Samples/active-directory-aspnetcore-webapp-openidconnect-v2/tree/master/1-WebApp-OIDC/1-1-MyOrg, Retrieved Date: Mar. 2, 2020, 07 Pages.
Brenck, et al., "Signing Out", Retrieved from: https://github.com/Azure-Samples/active-directory-aspnetcore-webapp-openidconnect-v2/tree/master/1-WebApp-OIDC/1-6-SignOut, Retrieved Date: Feb. 28, 2020, 03 Pages.
Canumalla, et al., "Differences between MSAL JS and ADAL JS", Retrieved from: https://docs.microsoft.com/en-US/azure/active-directory/develop/msal-compare-msal-js-and-adal-js, Apr. 10, 2019, 04 Pages.
Flores, et al., "What is Conditional Access?", Retrieved from: https://docs.microsoft.com/en-US/azure/active-directory/conditional-access/overview, Sep. 17, 2019, 04 Pages.
Graham, et al., "Microsoft Graph Permissions Reference", Retrieved from: https://web.archive.org/web/20191104215928/https://docs.microsoft.com/en-US/graph/permissions-reference, Nov. 2, 2019, 100 Pages.
Guzman, et al., "Branding Guidelines for Applications", Retrieved from: https://docs.microsoft.com/en-US/azure/active-directory/develop/howto-add-branding-in-azure-ad-apps, Sep. 24, 2018, 05 Pages.

Guzman, et al., "How to: Configure Terms of Service and Privacy Statement for an App", Retrieved from: https://docs.microsoft.com/en-US/azure/active-directory/develop/howto-add-terms-of-service-privacy-statement, May 22, 2019, 04 Pages.
Guzman, Celeste DE., "How to: Use the Portal to Create an Azure AD Application and Service Principal that can Access Resources", Retrieved from: https://web.archive.org/web/20181130021237/https://docs.microsoft.com/en-US/azure/active-directory/develop/howto-create-service-principal-portal, Oct. 24, 2018, 12 Pages.
Guzman, et al., "Microsoft Identity Platform and Implicit Grant Flow", Retrieved from: https://docs.microsoft.com/en-us/azure/active-directory/develop/v2-oauth2-implicit-grant-flow, Nov. 19, 2019, 13 Pages.
Guzman, et al., "Microsoft Identity Platform and OAuth 2.0 Authorization Code Flow", Retrieved from: https://web.archive.org/web/20190715223905/https://docs.microsoft.com/en-US/azure/active-directory/develop/v2-oauth2-auth-code-flow, Jun. 17, 2019, 16 Pages.
Guzman, et al., "Microsoft Identity Platform Application Authentication Certificate Credentials", Retrieved from: https://docs.microsoft.com/en-US/azure/active-directory/develop/active-directory-certificate-credentials, Dec. 18, 2019, 05 Pages.
Guzman, et al., "Permissions and Consent in the Microsoft Identity Platform Endpoint", Retrieved from: https://web.archive.org/web/20191115211201/https://docs.microsoft.com/en-US/azure/active-directory/develop/v2-permissions-and-consent, Apr. 12, 2019, 14 Pages.
Guzman, et al., "Quickstart: Configure a Client Application to Access Web APIs", Retrieved from: https://docs.microsoft.com/en-US/azure/active-directory/develop/quickstart-configure-app-access-web-apis#configure-platform-settings-for-your-application, Aug. 7, 2019, 10 Pages.
Howard, et al., "Sign in Users and Call the Microsoft Graph API from a Javascript Single-Page Application (SPA)", Retrieved from: https://docs.microsoft.com/en-US/azure/active-directory/develop/tutorial-v2-javascript-spa, Mar. 20, 2019, 16 Pages.
Jayabalan, et al., "Redirect URI/reply URL Restrictions and Limitations", Retrieved from: https://docs.microsoft.com/en-US/azure/active-directory/develop/reply-url, Jun. 29, 2019, 04 Pages.
Kess, et al., "Single Sign-on to Applications in Azure Active Directory", Retrieved from: https://web.archive.org/web/20190909000255/https://docs.microsoft.com/en-US/azure/active-directory/manage-apps/what-is-single-sign-on, Jul. 17, 2019, 09 Pages.
Leavitt, et al., "Overview of Microsoft Authentication Library (MSAL)", Retrieved from: https://docs.microsoft.com/en-us/azure/active-directory/develop/msal-overview, Oct. 30, 2019, 03 Pages.
Leavitt, et al., "Token Cache Serialization in MSAL.NET", Retrieved from: https://docs.microsoft.com/en-us/azure/active-directory/develop/msal-net-token-cache-serialization, Sep. 16, 2019, 09 Pages.
McAllister, et al., "Migrate iOS Applications that Use Microsoft Authenticator from ADAL.NET to MSAL.NET", Retrieved from: https://docs.microsoft.com/en-us/azure/active-directory/develop/msal-net-migration-ios-broker, Sep. 8, 2019, 06 Pages.
McLllene, et al., "DNS Resource Record Management", Retrieved from: https://docs.microsoft.com/en-us/windows-server/networking/technologies/ipam/dns-resource-record-management, Sep. 28, 2019, 04 Pages.
Mohanram, et al., "What are Managed Identities for Azure Resources?", Retrieved from: https://docs.microsoft.com/en-us/azure/active-directory/managed-identities-azure-resources/overview, Sep. 26, 2019, 07 Pages.
Prieur, et al., "A Web API that calls Web APIs: Code Configuration", Retrieved from: https://docs.microsoft.com/en-us/azure/active-directory/develop/scenario-web-api-call-api-app-configuration?tabs=aspnetcore, Jul. 16, 2019, 05 Pages.
Prieur, et al., "A Web App that Calls Web APIs: Code Configuration", Retrieved from: https://docs.microsoft.com/en-us/azure/active-directory/develop/scenario-web-app-call-api-app-configuration?tabs=aspnetcore, Oct. 30, 2019, 11 Pages.
Prieur, "Authentication Flows and Application Scenarios", Retrieved from: https://docs.microsoft.com/en-US/azure/active-directory/develop/authentication-flows-app-scenarios, Mar. 3, 2020, 14 Pages.
Prieur, et al., "Daemon App that Calls Web APIs—App Registration", Retrieved from: https://docs.microsoft.com/en-us/azure/active- (56) References Cited

OTHER PUBLICATIONS directory/develop/scenario-daemon-app-registration#api-permissions---app-permissions-and-admin-consent, Sep. 15, 2019, 04 Pages.

Prieur, et al., "Daemon App that Calls Web Apis—Code Configuration", Retrieved from: https://docs.microsoft.com/en-US/azure/active-directory/develop/scenario-daemon-app-configuration?tabs=dotnet, Oct. 30, 2019, 05 Pages.

Prieur, et al., "Desktop App that Calls Web APIs: Acquire a Token", Retrieved from: https://docs.microsoft.com/en-us/azure/active-directory/develop/scenario-desktop-acquire-token?tabs=dotnet, Oct. 30, 2019, 28 Pages.

Prieur, et al., "Desktop App that Calls Web APIs: App Registration", Retrieved from: https://docs.microsoft.com/en-us/azure/active-directory/develop/scenario-desktop-app-registration#audience-for-desktop-app-silent-flows, Sep. 9, 2019, 03 Pages.

Prieur, et al., "Desktop App that Calls Web APIs: Code Configuration", Retrieved from: https://docs.microsoft.com/en-us/azure/active-directory/develop/scenario-desktop-app-configuration?tabs=dotnet, Oct. 30, 2019, 06 Pages.

Prieur, et al., "Migrating Applications to MSAL.NET", Retrieved from: https://docs.microsoft.com/en-US/azure/active-directory/develop/msal-net-migration, Apr. 10, 2019, 10 Pages.

Prieur, et al., "Web Appthat Signs in Users: Code Configuration", Retrieved from: https://docs.microsoft.com/en-us/azure/active-directory/develop/scenario-web-app-sign-user-app-configuration?tabs=aspnetcore, Oct. 30, 2019, 07 Pages.

Sharkey, et al., "Quickstart: Configure an Application to Expose Web APIs", Retrieved from: https://docs.microsoft.com/en-US/azure/active-directory/develop/quickstart-configure-app-expose-web-apis, Aug. 14, 2019, 06 Pages.

Singhal, et al., "Microsoft Identity Platform and OAuth 2.0 Resource Owner Password Credentials", Retrieved from https://docs.microsoft.com/en-us/azure/active-directory/develop/v2-oauth-ropc, Nov. 19, 2019, 05 Pages.

Singhal, et al., "Microsoft Identity Platform and OpenID Connect Protocol", Retrieved from: https://docs.microsoft.com/en-us/azure/active-directory/develop/v2-protocols-oidc#send-a-sign-out-request, Apr. 12, 2019, 13 Pages.

Teixeira, et al., "Quickstart: Add Sign-In with Microsoft to an ASP.NET Core Web App", Retrieved from: https://docs.microsoft.com/en-us/azure/active-directory/develop/quickstart-v2-aspnet-core-webapp, Apr. 11, 2019, 06 Pages.

Wang, Aisha, "A.NET Core Daemon Console Application using Microsoft Identity Platform (formerly Azure AD v2.0)", Retrieved from: https://github.com/Azure-Samples/active-directory-dotnetcore-daemon-v2, Retrieved Date: Feb. 28, 2020, 03 Pages.

Wike, et al., "Azure Active Directory Authentication Libraries", Retrieved from: https://docs.microsoft.com/en-us/azure/active-directory/azuread-dev/active-directory-authentication-libraries, Dec. 1, 2018, 04 Pages.

Wike, et al., "Microsoft Identity Platform Authentication Libraries", Retrieved from: https://docs.microsoft.com/en-us/azure/active-directory/develop/reference-v2-libraries#microsoft-supported-client-libraries, Jul. 25, 2019, 06 Pages.

Wike, et al., "Microsoft Identity Platform Best Practices and Recommendations", Retrieved from: https://docs.microsoft.com/en-us/azure/active-directory/develop/identity-platform-integration-checklist, Sep. 11, 2019, 05 Pages.

Wike, et al., "Public Client and Confidential Client Applications", Retrieved from: https://docs.microsoft.com/bs-latn-ba/azure/active-directory/develop/msal-client-applications, Apr. 25, 2019, 03 Pages.

Wike, et al., "Understanding Azure AD Application Consent Experiences", Retrieved from: https://docs.microsoft.com/en-us/azure/active-directory/develop/application-consent-experience, Mar. 27, 2019, 10 Pages.

Wike, Ryan, "Understanding the OAuth2 Implicit Grant Flow in Azure Active Directory (AD)", Retrieved from: https://docs.microsoft.com/en-us/azure/active-directory/azuread-dev/v1-oauth2-implicit-grant-flow#suitable-scenarios-for-the-oauth2-implicit-grant, Aug. 15, 2019, 04 Pages.

Wike, Ryan, "Why Update to Microsoft Identity Platform (v2.0)?", Retrieved from: https://docs.microsoft.com/en-US/azure/active-directory/azuread-dev/azure-ad-endpoint-comparison#incremental-and-dynamic-consent, Nov. 26, 2019, 09 Pages.

"International Search Report & Written Opinion issued in PCT Application No. PCT/US20/065181", dated Mar. 17, 2021, 15 Pages.

* cited by examiner

USER INTERFACE 108

SELECT APPLICATION TYPE

- 354 — ☐ SINGLE PAGE APP
- 356 — ☐ WEB API
- 358 — ☐ BACKGROUND PROCESS OR AUTOMATION
- 360 — ☐ MOBILE APPLICATION
- 362 — ☐ WEB APPLICATION
- 364 — ☐ DESKTOP CONSOLE APPLICATION

ARE YOU CALLING AN API?

366 — ☐ YES    368 — ☐ NO

FIG. 7

DYNAMIC INTEGRATION CHECKLIST FOR DEVELOPMENT PLATFORM

RELATED APPLICATION

This application claims the benefit of priority to U.S. Provisional Patent Application No. 62/955,852, filed on Dec. 31, 2019 and titled "Dynamic Integration Checklist for Development Platform", which is incorporated herein by reference in its entirety.

BACKGROUND

Development platforms are sometimes referred to as application programming interfaces (APIs) or software development kits (SDKs), although there is typically much more to a development platform than the API or SDK. The development platform allows an entity to open their product to a marketplace of $3^{rd}$ party developers. This allows the $3^{rd}$ party developers to integrate the product on the development platform into other tools, build on top of the product on the development platform, and drive more transactions and revenue through the product. Development platforms thus can help take a product from a point solution to being a part of more products.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Methods for guiding a user through a cloud application deployment process using a development platform is provided. The method can be performed by a checklist engine. The method can include receiving, from the development platform, application data indicating a state of the cloud application. The method can include determining, based on the application data, that an item of a checklist has been completed, the checklist indicating tasks to be performed for configuring and securing the cloud application for deployment. The method can include storing data indicating the completed item is completed in a checklist data database. The method can include causing a view of the checklist to be provided on a display.

The checklist can indicate items to be performed (a) before testing the cloud application, (b) after testing the cloud application and before deploying the cloud application, or (c) after the cloud application is deployed. The application data can include an application object including data indicating one or more uniform resource locators (URLs), security data, permissions data, usage data, sign in data, session details data, or privileges data.

The view of the checklist can include respective tasks in separate portions of the display. A separate portion of the separate portions can include a documentation link that, when selected, causes a view of documentation of the respective task to be presented on the display. A separate portion of the separate portions includes a code link that, when selected, causes a view of sample code of the respective task to be presented on the display.

The method can include generating the checklist based on a flow graph of an application development and deployment process, wherein nodes of the flow graph represent tasks and arrows of the flow graph represent temporal relationships between the nodes. The method can include, wherein the tasks are different for different types of applications.

Other embodiments can include one or more systems or apparatuses configured to perform the method. Yet other embodiments can include a machine-readable medium including instructions that, when executed by a machine (e.g., a checklist engine) to perform the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to a subsystem, service, module, engine, or the like which can be software, hardware, firmware or a combination thereof. Multiple functions may be performed in one or more subsystem, service, module, engine, or the like, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Embodiments described herein can advantageously improve application management on a development platform. As discussed in the background, a development platform can help take a product from a point solution to be a part of more products. The developer platform can provide access to program code, security functions, software libraries, or other components. The developer platform, however, is a complicated tool. Often, the development platform 102 is designed primarily for use by app developers and administrators who create and manage an application for others to access or for operation in the background. Application developers rely heavily on documentation that indicates best practices and how to develop an application. Often times, a user will use a web search to find the documentation they are looking for. This presents the issue of users searching excessively, not finding what they are looking for, or landing on documentation not created, monitored, or approved for the development platform.

Many users have no knowledge of development features recommended for best practices or ease of application management. This indicates that some users can be unaware of the resources provided to guide them through the development process (from registration, to test, to launch) or how to best manage their application, such as the help ensure the application runs fast and securely. Some users are unsure/not confident of what to do after registering. Many users of the development platform are not fully qualified for application development. Less technical roles, such as administrators, often times are responsible for registering and managing an application creation and deployment.

Given the technical problems of application developer confusion, frustration, expertise, among others, a technical solution is needed. Embodiments provide a technical solution that provides a sort of intermediary between the user and the developer platform. Embodiments use a checklist engine to inform the user of best practices and requirements for application development. The checklist engine can produce a first checklist of items to be accomplished up to application test or a second checklist of items to be accomplished between application test and application deployment. The checklist engine can automatically indicate, on the checklist, whether an item has been totally completed, partially completed, not started, or the like. The checklist engine can cause a display to provide respective tasks to be completed in respective segregated regions of the display. In each segregated region, the checklist engine can cause the display to provide a link to relevant documentation or code that regards how to perform the task associated with that segregated region.

In some embodiments, the user is allowed to manually check a certain item as being complete. In some embodiments, only the checklist engine can change a status of certain items (indicating whether the item is complete or not).

The tasks provided by the checklist engine can be different for different application types and for different application configurations. For example, respective checklists for a single page application, web application, web API, daemon, mobile application, and desktop application can be different.

In some embodiments, the respective checklists can be changed differently for different application types if the application calls an API. For example, a checklist for a single page application that calls an API can include additional checklist items beyond the checklist for the single page application that does not call the API, Additional checklist items for a daemon that calls an API can be different than the additional checklist items for the single page application that calls the API.

Figure 1:
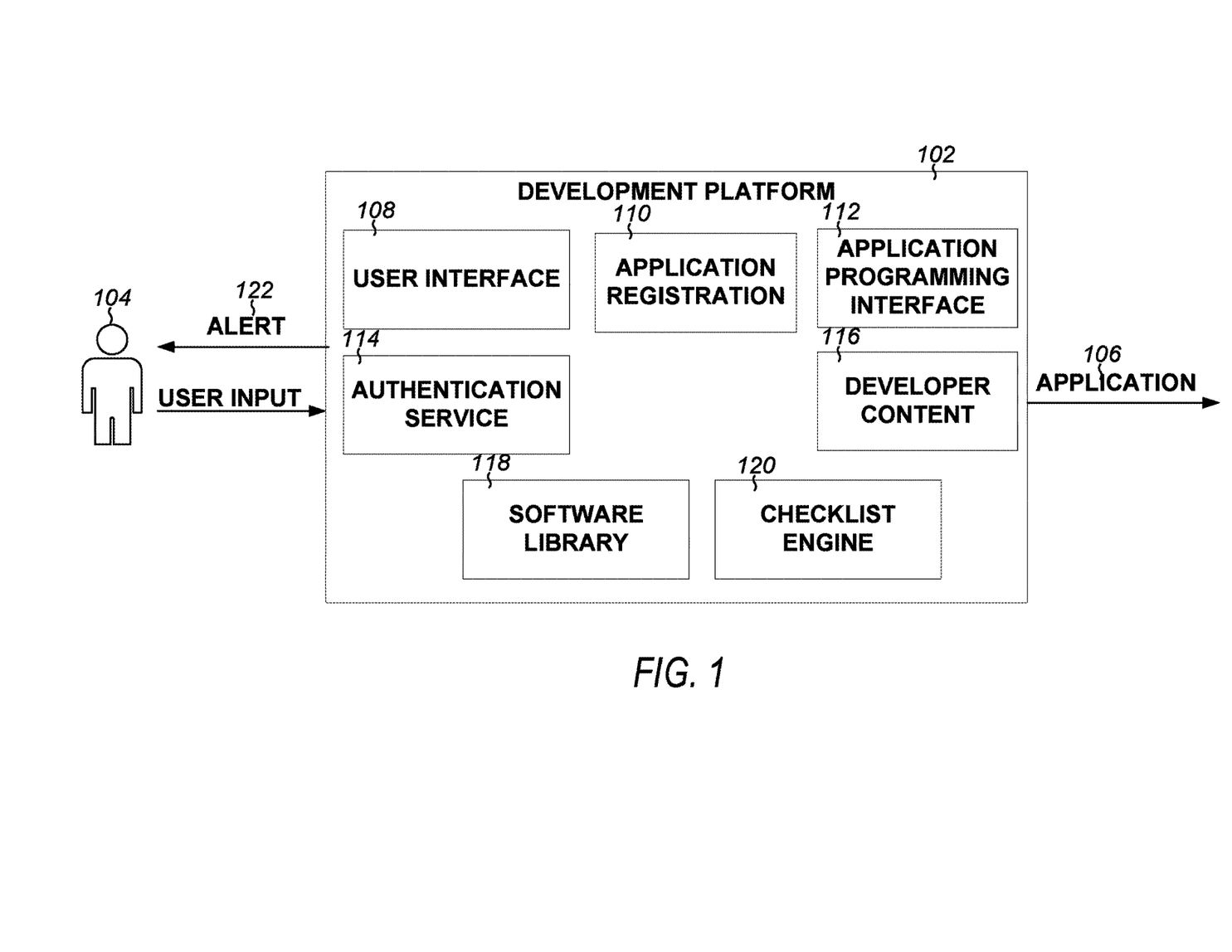
FIG. 1 illustrates, by way of example, a block diagram of an embodiment of a development platform.

FIG. 1 illustrates, by way of example, a block diagram of an embodiment of a development platform 102, The development platform 102 can allow a user 104 to more easily generate an application 106 and allow others access to the application 106 than other application generation solutions. The development platform 102 provides the user 104 with a clearer understanding of next steps required and recommended for application development and deployment. The clearer understanding is provided, at least partially, by the checklist engine 120.

The development platform 102 as illustrated includes a user interface 108, application registration service 110, API 112, authentication service 114, developer content 116, software library 118, and the checklist engine 120. The user interface 108 allows the user 104 to interact with the components of the development platform 102, The user interface 108 is the item through which the user 104 is informed of the state of their application. The user interface 108 allows the user to alter the application. The user 104 typically uses hardware to provide input to the user interface 108. The user interface 108, in turn provides data to a component of the development platform 102 to which the user interaction is directed. The user interface 108 can be presented on a display (an example of a communication interface 616, see FIG. 6). The checklist 226 of an incomplete phase can be provided on the user interface 108 in response to the user 104 logging on to the development platform 102. An incomplete phase means that a required task or a recommended task are not complete (or not yet manually indicated as being complete).

The application registration service 110 allows the user 104 to register an application. Registration provides the user 104 with the ability to authenticate users and request access to user resources. The registration service 110 can generate an application object corresponding to a registered application. The application object is a piece of code that defines the schema and properties of the application. Application objects can have associated members that are events, method, properties. Examples of events include a certificate expiring, login information expiring, or the like. Examples of methods include help, hide, load, quit, show, or the like. Examples of properties include documents associated with the application object, frame objects, user control settings, version numbers, visibility, or the like.

The API 112 is the APIs that are available for calling by the application 106. The API 112 is an interface or communication protocol between hardware, application 106, operating system, software library 120, or the like. By calling the API 112, the details of the communication need not be known to the developer as the API handles the details. The API 112 can include functions, data structures, object classes, variables, remote calls, or the like. In embodiments, the user interface 108 can communicate to one or more other components of the development platform through the API 112.

The authentication service 114 allows the user 104 to define users allowed to access the application. The authentication service 114 can perform user credential verification to verify the user has permission to access the application 106. Verification can include receiving a password and verifying the password is associated with a corresponding device identification, application identification, or the like. In some embodiments, the authentication service 114 can verify the user has a token to access the application 106.

The developer content 116 provides materials to aid in working with the API 112 and other portions of the development platform. The developer content 116 can provide support for API key provisioning, payments, registration, authentication, or the like. The developer content 116 can include low level and high-level documentation that helps developers launch the application 106.

The software library 118 is the code base for already developed, available to use, applications or application functions. The software library 118 can include headers, classes, procedures, scripts, and configuration data, among others. The software library 118 can include the code that implements the interface provided by the API 112. A complete set of software code for a specific platform (e.g., Windows®, Linux, Android, etc.) in the software library 118 is sometimes called a software development kit (SDK).

The checklist engine 120 can monitor the application 106 development process. The checklist engine 120 can cause the user interface 108 to provide a checklist 124 to the user 104. The checklist 124 can indicate items and their status (e.g., partially complete, complete, not started, or the like). The checklist 124 can include one or more link(s) to relevant documentation for accomplishing the items. The items can indicate actions that are required to deploy the application 106, The items can indicate actions that are not required for deployment but are best practices for the application 106 based on the application type. These items are sometimes called recommended items.

In embodiments, the development platform 102 can cause an alert 122 to be issued to the user 104. The alert 122 can indicate to the user 104 that there is a required or recommended action to be performed on their deployed application or application in progress. The alert 122 can be provided by electronic mail (email), simple messaging service (SMS) message, a phone call (e.g., automated), a notification on a smartphone or other computing device, or the like. The alert 122 can include a link that, when selected by the user 104, causes a webpage with the checklist corresponding to the alert 122 to be displayed.

Figure 2:
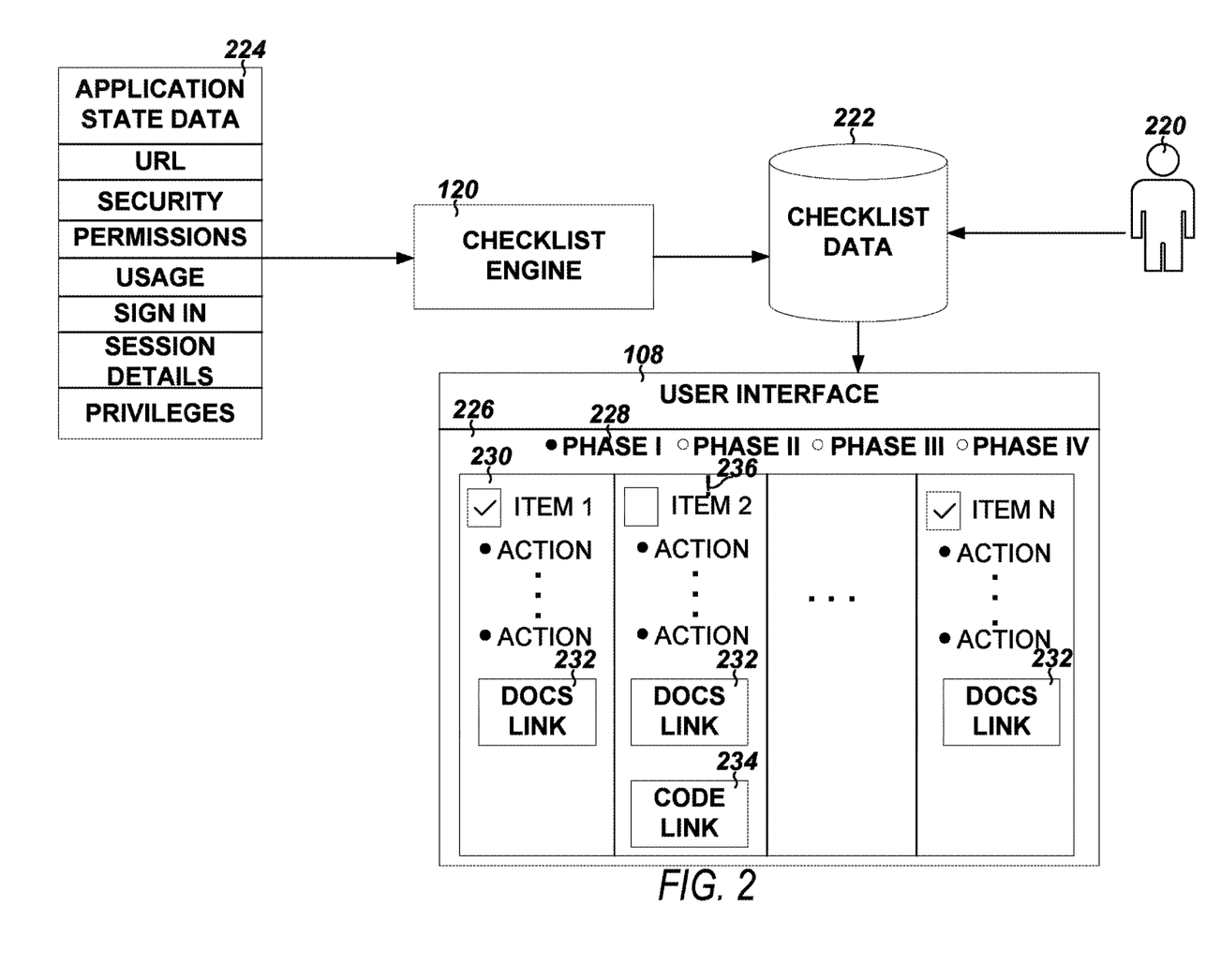
FIG. 2 illustrates, by way of example, a diagram of an embodiment of a checklist system.

FIG. 2 illustrates, by way of example, a diagram of an embodiment of a checklist system. The checklist system can be a part of the development platform 102. The checklist system as illustrated includes the checklist engine 120, the user interface 108, a checklist data database 222, and application state data 224. The checklist system can be managed by an administrator 220.

The checklist engine 120 can receive the application state data 224. The application state data 224 can include data indicating whether a URL has been designated for accessing the application 106, whether security protocols (e.g., secure socket layer (SSL), web application firewall, authentication verification, or the like), permissions (e.g., devices or applications allowed to access the application 106 or portions of the application 106), usage (e.g., the functions, APIs, or other portions of the application 106 that have executed), sign in (e.g., the devices or applications that have signed in to use the application), session details (e.g., date, time, duration, or the like of the usage), or privileges (e.g., data indicating the analytics, APIs, software, or the like that the application 106 or user 104 is allowed to call or otherwise access).

The checklist engine 120 can alter a state of a checklist 226 by altering data in the checklist data database 222. The checklist data database 222 include data indexed by an application identification that uniquely identifies the application 106. The checklist data database 222 can include, for each phase control 228 of each application, items 230 to be completed. Each of the items 230 can include actions to be performed to complete the items 230. Each of the items 230 can include an associated link to documentation (e.g., the documentation link 232), In response to the user 104 selecting the documentation link 232, the user interface 108 can cause the documentation associated with the item 230 to be displayed.

The user 104 can select different phases to change the checklist 226 in view on the user interface 108. The different phases can include develop, test, release, monitor, or the like. In response to selecting a different phase control 228, the user interface 108 can provide the user with a view of the checklist corresponding to the selected phase. Since different phases likely have different items, the items 230 (and corresponding actions and links to documentation) displayed for the selected phase control 228 will change. While FIG. 2 illustrates four phases, greater or fewer phases can be used.

The checklist engine 120 can automatically update the checklist 124. The checklist engine 120 can monitor the application state (an application object including the application state data 224) and update the checklist data corresponding to the checklist 226 in the checklist data database 222 based on the application state. The user interface 108 can request or retrieve the checklist data from the checklist data database 222 and present the checklist data to the user 104.

The administrator 220 can define content of the data structures for the checklist data in the checklist data database 222. The data structure can indicate the actions, items, documentation, or the like of the checklist data corresponding to the checklist 226. The administrator 220 can indicate a source for the checklist data. The checklist engine 120 can use the source information to determine where to find the checklist data corresponding to the checklist 226.

The data corresponding to the checklist 226 can be stored in a separate storage medium from the development platform 102 code. In some embodiments, the development platform 102 can present the checklist 226 on the user interface 108 by calling the externally hosted checklist 226. The checklist engine 120 can cross check the application object (e.g., including the application state data 224) with the checklist to present items automatically marked as complete or incomplete.

A task 230 can be indicated as urgent using an urgency, indicator 236. The urgency indicator 236 can include a symbol or character that draws the attention of the user 104 to the task 230. The urgency indicator 236 can be displayed on a portion of the user interface 108 dedicated to the corresponding task. The urgency indicator 236 can be provided to indicate a security vulnerability, a new task that has been added since the application 106 was first developed (at least partially developed), an update to code associated with the application 106 has been provided, a better practice is now accepted for security or execution of the application 106, or the like.

In embodiments, code for the application 106 can be created as the user 104 makes selections on the user interface 108. For example, as a user selects a platform, an application type, or the like, the code for the platform and the application type can be generated. The code can be displayed or accessed by the user 104 selecting a code link 234.

Figure 3:
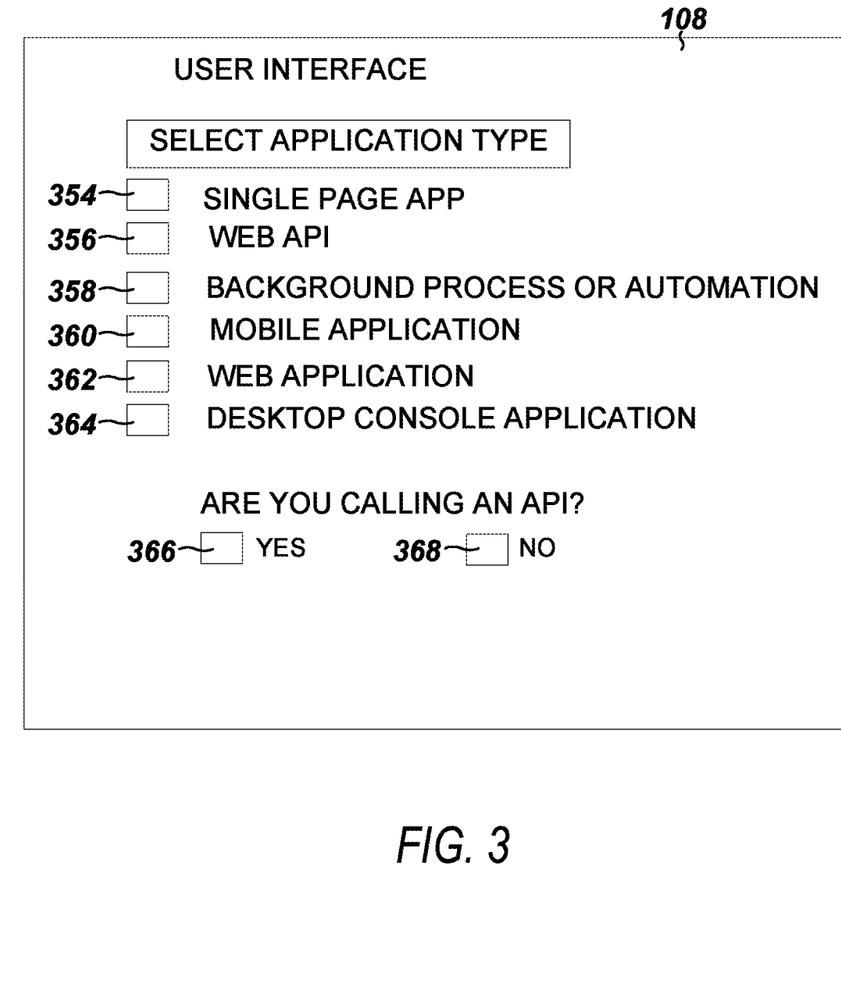
FIG. 3 illustrates, by way of example, a diagram of an embodiment of the user interface.

FIG. 3 illustrates, by way of example, a diagram of an embodiment of the user interface 108. The user interface 108 as illustrated includes a static section to the left of a dynamic section. The static section could be to the right, above, or below the dynamic section in some embodiments. The static section remains on the user interface 108 until the user closes or otherwise navigates away from the website being provided by the user interface 108. The static section remains on the user interface in response to the user 104 selecting an item in the static section or dynamic section.

Items in the dynamic section of a user interface 108 of FIG. 3 include application type controls 354, 356, 358, 360, 362, 364, and calling an API controls 366, 368. Controls are software controls that perform an operation in response to selection by the user 104. Selection can include an audio command, a mouse button press while over the control, a touchscreen touch on the control, or the like. The software controls can include selection boxes, radio buttons, or other types of software controls.

The view provided by the user interface 108 of FIG. 3 is after the user 104 has selected the checklists control 336. The user interface 108 provides the user 104 with the option to select an application type using the controls 354, 356, 358, 360, 362, 364. In response to the user 104 selecting one of the controls 354, 356, 358, 360, 362, 364 the user interface 108 can provide a view of the checklist for that application type. The checklist provided can be for actions that are to be completed first, in the application deployment process. For an application for which the user 104 has performed some operations for deployment, the user 104 can select the phase control 228 to go to the point relevant in their deployment process.

In some embodiments, the checklist engine 120 or other item of the development platform 102 can record user selections received through the user interface 108, such as in the checklist data database 222. Then, after the user 104 signs in, the previous selections and progress of the user 104 can be loaded and the user interface 108 can be caused to display a checklist for a first incomplete phase of the application deployment process. For example, if all required, recommended, or a combination thereof items of phase I are completed and not all required, recommended, or a combination thereof items of phase II are not completed, the user interface 108 can display the checklist 226 for phase II, skipping phase I. The user 104 can navigate back to phase I by selecting the corresponding phase control 228 on the user interface 108.

Figure 4:
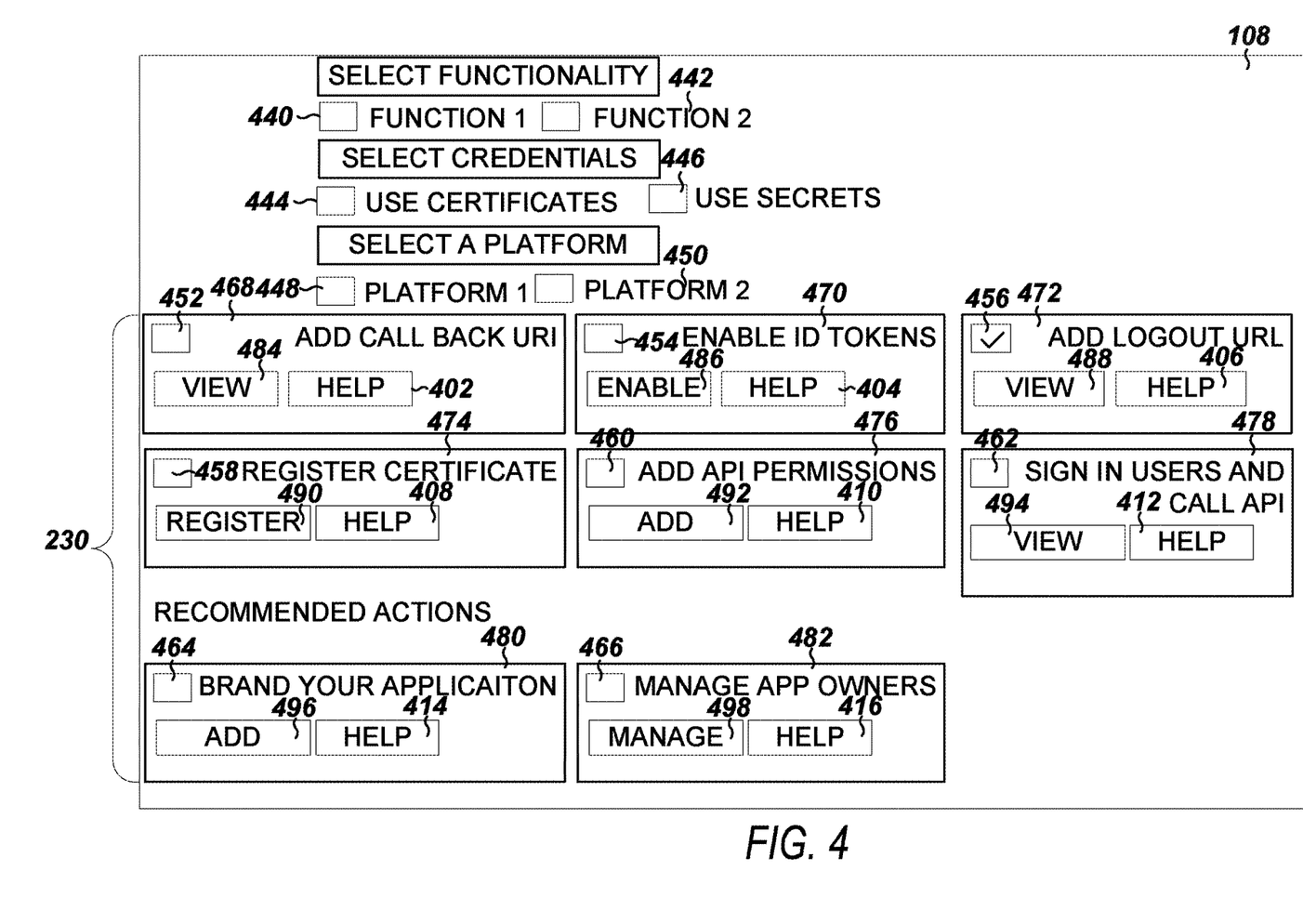
FIG. 4 illustrates, by way of example, a diagram of an embodiment of the user interface after the user has selected a control to indicate they are developing a web application and another control to indicate their application is calling an API.

FIG. 4 illustrates, by way of example, a diagram of an embodiment of the user interface after the user 104 has selected the control 362 to indicate they are developing a web application and the control 366 to indicate their application is calling an API. The static portion of the user interface 108 is not shown in FIG. 4 to focus on items of the dynamic portion of the user interface 108.

The user interface 108 of FIG. 4 includes configuration choices that are performed automatically by the development platform 102 in response to the user selecting and saving progress. The configuration choices of FIG. 4 include functionality, or software functions, selecting credentials (used for authentication by the authentication service 114), and selecting a platform (e.g., ASP, Python, Perl, Django, Laravel, Haskell, PHP, Node.js, Flask, Ruby on Rails, or the like). The functionality can include "sign in users", "call an API", or the like. The software functions can be part of the software library 118.

The user interface 108 of FIG. 4 further provides a view of the checklist 226. The checklist 226 includes required tasks and recommended tasks. Each of the tasks can include a checklist indicator 452, 454, 456, 458, 460, 462, 464, 466. The checklist indicator 452, 454, 456, 458, 460, 462, 464, 466 indicates whether the task is complete or not complete. In the example of FIG. 4, the task for adding a logout URL is complete and the remaining tasks are incomplete, as indicated by the checklist indicator 452, 454, 456, 458, 460, 462, 464, 466.

The checklist engine 120 can lookup the source for the task in the checklist data database 222. The checklist engine 120 can issue a communication, a query, or the like, to the indicated source. A response to the communication or query can determine whether the task is complete or incomplete. The checklist engine 120 can write data to the checklist data database 222 consistent with the response to the communication. The user interface 108 can then be populated based on the checklist data in the checklist data database 222, providing accurate data regarding the state of the application 106 (e.g., automatically, such as without human interference after deployment).

The checklist 226 as illustrated includes bounded, segregated portions 468, 470, 472, 474, 476, 478, 480, 482 dedicated to respective tasks (recommended and required tasks). The segregated portions 468, 470, 472, 474, 476, 478, 480, 482 correspond to a respective task of the checklist 226. Controls 484, 486, 488, 490, 492, 494, 496, 498 within the segregated portions 468, 470, 472, 474, 476, 478, 480, 482, respectively, direct the user 104 to a webpage of another checklist for completing the task. Other controls 402, 404, 406, 408, 410, 412, 414, 416 within the segregated portions 468, 470, 472, 474, 476, 478, 480, 482, respectively, when selected, provide information for completing the task or why the task is important. In some embodiments, the controls 402, 404, 406, 408, 410, 412, 414, 416, when selected can provide a view of documentation similar to the documentation provided by the documentation links 232. The documentation links 232 and code links 234 can be framework and language specific. The link 232, 234 can change based on user selection. That is the documentation link 232 or code link 234 destination can change to provide the user 104 with the documentation or code relevant to the application 106. In some embodiments, the controls 402, 404, 406, 408, 410, 412, 414, 416, when selected, cause a webpage regarding the task to be displayed on the user interface 108.

Figure 5:
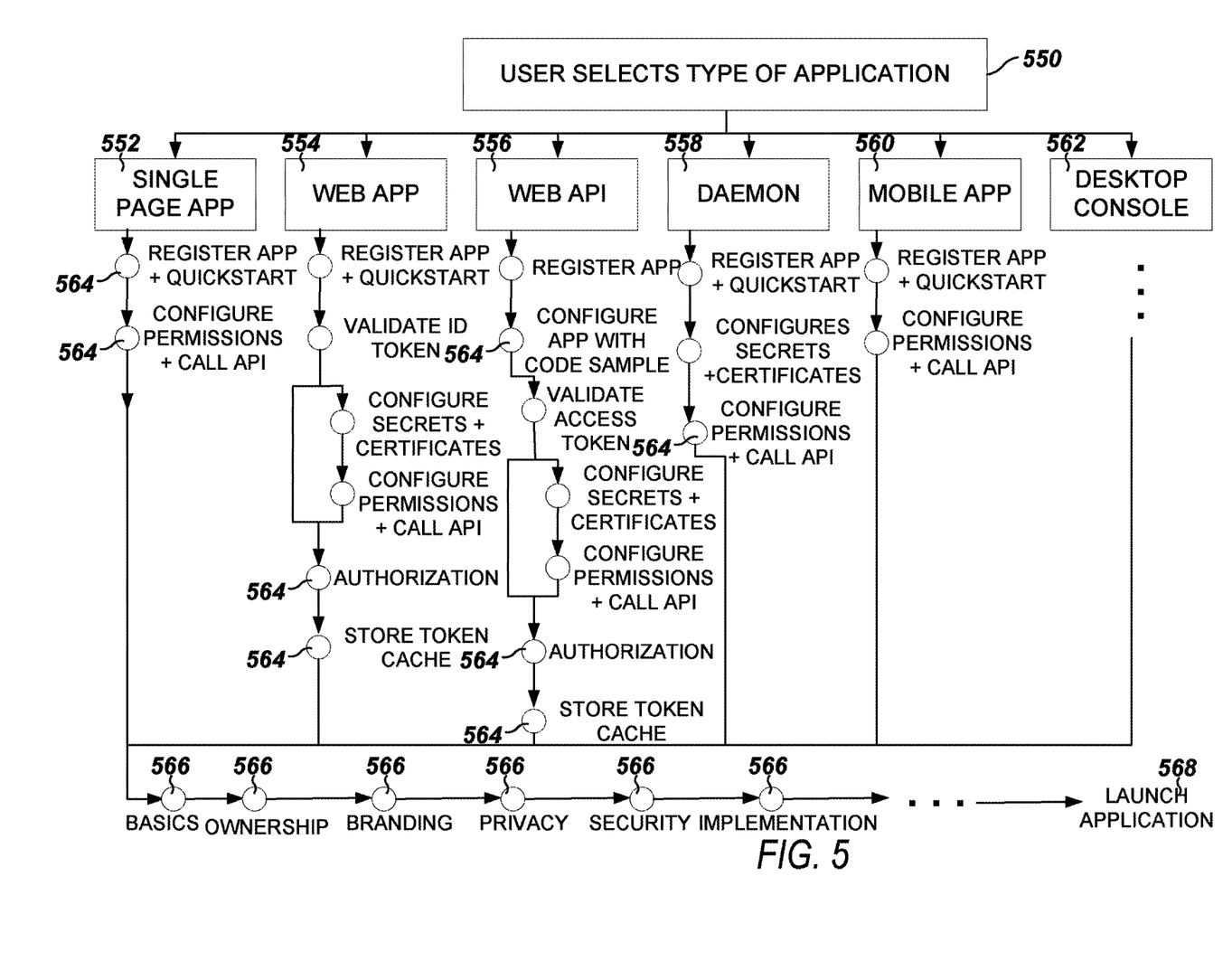
FIG. 5 illustrates, by way of example, a diagram of an embodiment of a flow plot of application developments processes.

FIG. 5 illustrates, by way of example, a diagram of an embodiment of a flow plot of application developments processes. The flow plot defines what items are provided in the checklist 226. Nodes 564, 566 indicate required and recommended tasks for the development of the application 106. Not all nodes 564 are labelled so as to not obscure the view of the plot in FIG. 5. The nodes 564 correspond to respective open circles with respective vertical arrows pointing thereto (arrows generally perpendicular to the arrows connecting the nodes 566). Any nodes 564 that must be traversed to get to an application launch operation 568 are required. Any nodes 564 that can be bypassed are recommended or optional tasks. The nodes 566 can be recommended, required, or optional.

The plot of FIG. 5 includes the user 104 selecting the type of application they are developing at operation 550. The types of applications illustrated include single page application 552, web application 554, web API 556, daemon 558, mobile application 560, and desktop console application 562. Each of the applications 552, 554, 556, 558, 560, application 562 can be selected by the user 104 selecting the corresponding control 354, 356, 358, 360, 362, 364 (see FIG. 3).

The checklist engine 120 can determine, for each node of the selected application type, whether the task corresponding to the node 564, 566 has been completed or not. The checklist engine 120 can write data to the database 222 indicating whether the task corresponding to the node has been completed. The user interface 108 can then be populated according to the data in the database 222.

In some embodiments, for some tasks, the checklist engine 120 cannot determine whether the task has been completed. For these tasks, the control indicating whether the task is completed can be selected by the user 104. In response to the user selecting the control, data in the database 222 indicating whether the task is complete can be updated and the view of the control in the user interface 108 can be toggled. If the data in the database 222 indicates the task is incomplete, that data can be changed to indicate the task is complete (and vice versa) in response to the user selecting the control. Examples of the control include the checklist indicator 452, 454, 456, 458, 460, 462, 464, 466 of FIG. 4. Examples of tasks that can be monitored by the checklist engine 120 include whether a redirect URL is configured, identification or access tokens are enabled, API permissions are configured, a certificate or secret is configured, an application identification URL is configured, a scope of an API exposure, an application role is defined, a logout URL is configured, a link to the terms of service or privacy statement is provided, redirect URLs are secure (e.g., hypertext transport protocol secure (HTTPS) is used, the URL is encrypted, or the like), no wildcards are used in the redirect URL, or the like. Examples of tasks that can be attested to manually by the user 104 can include reading and attesting to the platform policies, ensuring information provided by the user 104 is correct, adhering to the branding guidelines, providing a meaningful name and logo, review redirect URLs and remove unnecessary URLs, platform-specific URLs are used, application owners are reviewed and minimized, or the like.

Table I illustrates, by way of example, example application types and corresponding required tasks and additional tasks if an API is called.

TABLE I

Required Tasks for a Variety of Application Types

| Application Type | Required Tasks | Additional Tasks If Calling API |
| --- | --- | --- |
| Single Page | Redirect URL Access Tokens ID Tokens | API Permission |
| Web Application | Redirect URL Logout URL ID Token | Certificate/Secret API Permission |
| Web API | Application ID URL Define Application Roles | Certificate/Secret API Permission |
| Daemon | Certificate/Secret API Permission | |
| Mobile | Redirect URL | API Permission |
| Desktop | Redirect URL | API Permission |

Integrating the checklist engine 120 into the development platform 102 helps make it clear to the user 104 exactly when and how to take each step in the application development process, provides a stronger link between the task and documentation related to the task, the checklist engine 120 can incorporate resources into the development portal 102 to ensure that the user 104 is directed to documentation relevant to the task of interest and do not have to search for relevant resources, educate customers on when they should exercise the development platform 102 tools available and give the user 104 an understand both how to take 1advantage of development platform 102 resources and how and why to manage their application security, decrease dropoff statistics from, so that users 104 who access the development platform 102 have clear direction for what to do next, merge documents and other information to one location (the segregated task portion) so that the user 104 is more likely to complete the task, provide simple, actionable steps that do not overwhelm the user 104, integrate the development platform 102 and documentation so it is always clear how to accomplish a specific task. The checklist engine 120 help improve the overall security of the applications 106 generated using the development platform 102. The security is improved by guiding users through secure practices.

Some use cases enabled by embodiments are now discussed. Consider a new user (the user 104) that wants to register and build some components of their application. The user registers their application using the application registration service 110. After registration, the user 104 is asked, via the user interface 108, to select the desired platform for hosting the application 106. After registering, the user 104 is able to accomplish the tasks needed to allow the application to run effectively and securely. The user 104 is also able to view the core steps, via the user interface 108, to authenticate, authorize, or the like (including links to documentation and code samples) based on their application type. The user 104 can skip steps as needed and reference the checklist 226 as they desire, such as to see what they still need to do, and how to do it. The user 104 can be confident that they are correctly handling their application 106 properly. The user 104 is not confused by the different options available to them, as the checklist 226 provides clarity and confidence to the user 104.

Consider an existing user that has their app registered but does not use best practices in the application 106. In response to the user 104 logging on the development platform 102, the user interface 108 can provide the user 104 with a view of the checklist 226, The items in the checklist 226 that are indicated as being incomplete inform the user 104 of the best practices, and even why the tasks recommended are best practices. For example, the user 104 can enable and a secret, even though a certificate is a better practice. The user 104 may not understand this, but the checklist 226 can inform the user 104 of the better practice. The user 104 can then register a certificate for the application. The documentation links 232 can be selected by the user 104 to provide the documentation regarding how to update the code of the application 106 and rotate the certificates.

Consider an example in which the user 104 is an administrator (e.g., the administrator 220). The user 104 wants to register an application that a developer at his company created. The user 104 wants to register the application 106 on behalf of a developer for the company. The user 104 completes the registration, but since the user 104 did not develop the application 106, the user 104 does not know what else needs to be done to make sure the application 106 runs correctly. The user 104 can follow the steps of the checklist 226 and finish quickly, saving time that would have been wasted searching through the development platform 102 and trying to understand the details. The user 104 can manually mark off steps that do not apply to the user 104, like configuring the app code.

Consider an example in which a developer has security concerns relating to the application 106. The user 104 has several applications registered. One day, the development platform 102, via the user interface 108, presents him the user 104 with the checklist 226 of items to perform to get the applications to production. Since his applications are already in production, most of the items are already marked as complete, and the user 104 moves on. However, a few days later, the development platform 102 can alert the user 104, via the user interface 108, an email, text message (a simple messaging service (SMS) message) or the like, that there are new (e.g., urgent) items in the checklist 226. The user can visit the checklist 226 blade and learns that one of the certificates is close to expiration. The user 104 can update the certificates. The checklist engine 120 can automatically the checklist to indicate that the certificates have been updated. In some embodiments, the user interface 108 can remove the item from the checklist 226 or indicate (via a checkmark or other marking on the user interface 108) that the item is completed.

Consider an example in which the administrator 220 wants to allow developers to register their own applications while still following company guidelines and protocols. The administrator 220 works at ABC company, where app developers make hundreds of applications for internal processes and keeping the company running smoothly. However, the administrator 220 notices complaints about incongruences in the different applications his company offers. They are mislabeled, use inconsistent and nonapproved logos, request too many permissions for what they are used for and often don't follow the company security guidelines. The administrator 220 wants his developers to be able to register their own applications but wants to make sure company protocols are being followed. The administrator 220 can access the checklist 226, via the development platform 102 from his admin account and customize it to be ABC Company-specific, adding details like the suggested company logo to use and reminders of company guidelines.

Table II illustrates, by way of example, a variety of tasks for a variety of application types.

TABLE II

Tasks by application type and whether the operation can be checked off by consulting the application object or manual entry.

| TASK | DOC LINK/ CODE LINK | COMPLETION CHECK |
|---|---|---|
| WEB APP THAT SIGNS IN USERS AND WANTS SINGLE SIGNE OUT | | |
| Add redirect URL | DOC LINK | Application Object |
| Enable ID tokens | | Application Object |
| Add logout URL | DOC LINK | Application Object |
| Configure sign in code and acquire token | DOC LINK/ CODE LINK | Manual |
| WEB APP THAT CALLS API(S) | | |
| Add certificate/secret | DOC LINK | Application Object |
| Add API permissions | DOC LINK | Application Object |
| Configure API Code, Call an API | DOC LINK | Manual |
| SINGLE PAGE APPLICATION THAT SIGNS IN USERS | | |
| Add a redirect URL | DOC LINK | Application Object |
| Enable ID tokens | DOC LINK | Application Object |
| Configure sign in code and acquire token | DOC LINK | Manual |
| SINGLE PAGE APPLICATION THAT CALLS API(s) | | |
| Enable access tokens | DOC LINK | Application Object |
| Request delegated permissions | DOC LINK | Application Object |
| MOBILE APPLICATION THAT USES INTERACTIVE AUTHENTICATION | | |
| Add redirect URL | | Application Object |
| Add API permissions | DOC LINK | Application Object |
| Configure sign in code and acquire a token | CODE LINK | Manual |
| Configure API code and call an API | CODE LINK | Manual |
| MOBILE APPLICATION W/O INTERACTIVE AUTHENTICATION | | |
| Ensure personal accounts are not allowed | DOC LINK | Application Object |
| Test application as public client | DOC LINK | Application Object |
| Add API permission | DOC LINK | Application Object |
| DESKTOP APPLICATION W/AUTHENTICATION AND API CALL(S) | | |
| Add redirect URL | | Application Object |
| Request delegated API permissions | DOC LINK | Application Object |
| Configure sign in code and acquire token | DOC LINK | Manual |
| Confiture API code and call API | DOC LINK | Manual |
| DESKTOP APPLICATION W/O AUTHENTICATION AND W/API CALLS | | |
| Do not allow personal accounts | DOC LINK | Application Object |
| Test application using a public client | DOC LINK | Application Object |
| Add API permissions | DOC LINK | Application Object |
| WEB API THAT CALLS ANOTHER API | | |
| Define resource URL | | Application Object |
| Add a scope | | Application Object |
| Add certificate/secret | DOC LINK | Application Object |
| Add API permissions | DOC LINK | Application Object |
| Add application API permissions | DOC LINK | Application Object |
| Configure API code and call API | DOC LINK | Manual |
| DAEMON THAT CALLS API(S) | | |
| Add certificate/secret | DOC LINK | Application Object |
| Add application API permissions | DOC LINK | Application Object |
| Configure API code and call API | DOC LINK/ CODE LINK | Manual |
| RECOMMENDED TASKS | | |
| Brand application | DOC LINK | Application Object |
| Manage owners | | Manual |
| Test application for conditional policies | DOC LINK | Manual |
| Keep DNS records for redirect URLs up to date | DOC LINK | Manual |
| Traverse integration Checklist | DOC LINK | Manual |

Unless otherwise stated as an application permission, permissions are for users. The checklist engine 120 can consult the application object to determine (e.g., automatically, periodically, at a specified date or time, or the like)

whether task is complete. In some embodiments, the required tasks can be automatically monitored, and the recommended tasks can be manually indicated as either complete or incomplete. The required tasks can be platform-specific, and the recommended tasks can be platform-agnostic.

Figure 6:
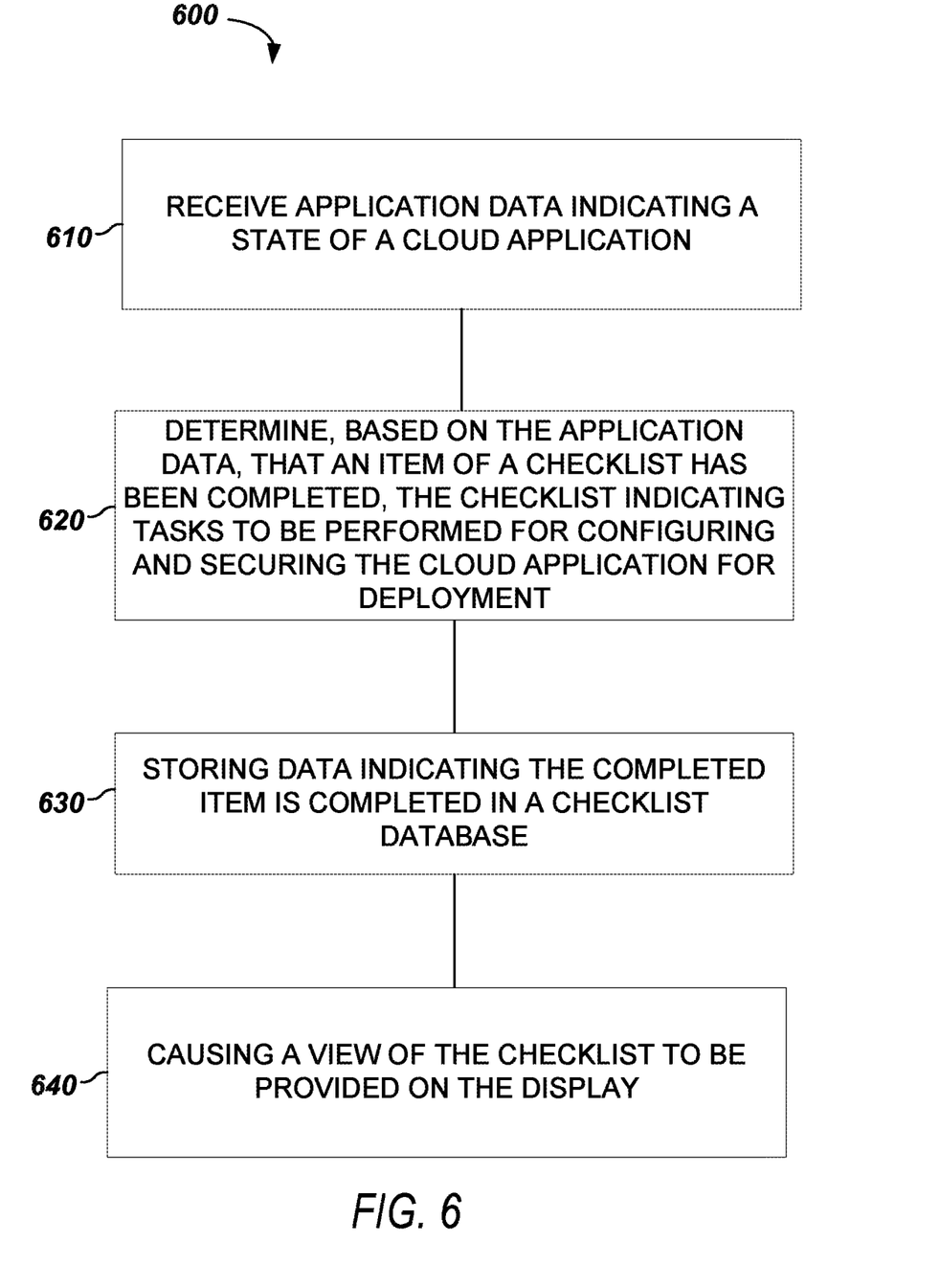
FIG. 6 illustrates, by way of example, a diagram of an embodiment of a method for improving application development using a development platform.

FIG. 6 illustrates, by way of example, a diagram of an embodiment of a method 600 for improving application development (e.g., creation or deployment) using a development platform. The method 600 as illustrated includes receiving, from the development platform, application data indicating a state of the cloud application, at operation 610; determining, based on the application data, that an item of a checklist has been completed, the checklist indicating tasks to be performed for configuring and securing the cloud application for deployment, at operation 620; storing data indicating the completed item is completed in a checklist data database, at operation 630; and causing a view of the checklist to be provided on a display, at operation 640.

The checklist can indicate items to be performed (a) before testing the cloud application, (b) after testing the cloud application and before deploying the cloud application, or (c) after the cloud application is deployed. The application data can include an application object including data indicating one or more uniform resource locators (URLs), security data, permissions data, usage data, sign in data, session details data, or privileges data.

The view of the checklist can include respective tasks in separate portions of the display. A separate portion of the separate portions can include a documentation link that, when selected, causes a view of documentation of the respective task to be presented on the display. A separate portion of the separate portions can include a code link that, when selected, causes a view of sample code of the respective task to be presented on the display.

The method 600 can include generating the checklist based on a flow graph of an application development and deployment process, wherein nodes of the flow graph represent tasks and arrows of the flow graph represent temporal relationships between the nodes. The method 600 can further include, wherein the tasks are different for different types of applications.

The checklist 226 can be altered based on user 104 usage of and feedback on the checklist 226. The usage data and the feedback can be used as input to a machine learning (ML) technique for determining how to alter, augment, or otherwise change the checklist 226 for improving the user experience, application security, or application execution.

Artificial intelligence (AI) is a field concerned with developing decision-making systems to perform cognitive tasks that have traditionally required a living actor, such as a person. Neural networks (NNs) are computational structures that are loosely modeled on biological neurons, Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections, NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the Output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 7:
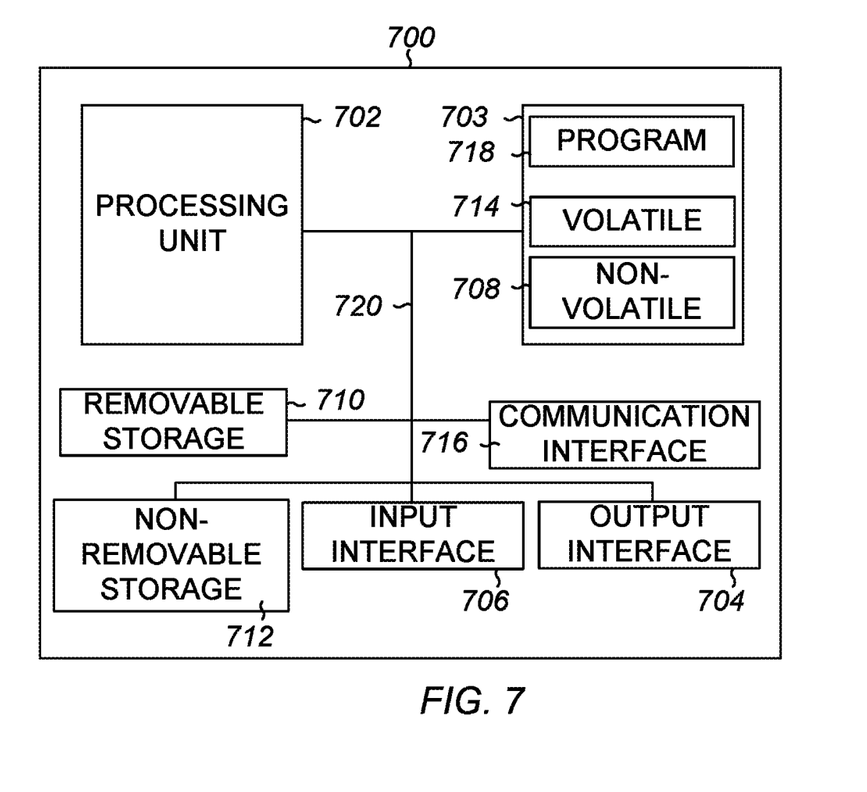
FIG. 7 illustrates, by way of example, a block diagram of an embodiment of a machine (e.g., a computer system) to implement one or more embodiments or components of embodiments.

FIG. 7 illustrates, by way of example, a block diagram of an embodiment of a machine 700 (e.g., a computer system) to implement one or more embodiments. The machine 700 may implement a technique to improve application deployment using a development platform, such as discussed herein. Any of the items of the development platform 102 can include or be implemented using one or more of the items of the machine 700. For example, a module can be executed, an interface can be populated or executed, a service can be executed, or the like. As used herein an "engine" or "module" can include software, hardware, firmware, a combination thereof or the like.

One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include— or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

Additional Notes and Examples

Example 1 includes a medium including instructions that, when executed by a checklist engine, cause the checklist engine to perform operations for guiding a developer through a cloud application creation or deployment process using a development platform, the operations comprising receiving, from the development platform, application data indicating a state of the cloud application, determining, based on the application data, that an item of a checklist has been completed, the checklist indicating tasks to be performed for configuring and securing the cloud application for deployment, storing data indicating the completed item is completed in a checklist data database, and causing a view of the checklist to be provided on a display.

In Example 2, Example 1 can further include, wherein the checklist indicates items to be performed (a) before testing the cloud application, (b) after testing the cloud application and before deploying the cloud application, or (c) after the cloud application is deployed.

In Example 3, at least one of Examples 1-2 can further include, wherein the application data includes an application object including data indicating one or more uniform resource locators (URLs), security data, permissions data, usage data, sign in data, session details data, or privileges data.

In Example 4, at least one of Examples 1-3 can further include, wherein the view of the checklist includes respective tasks in separate portions of the display.

In Example 5, Example 4 can further include, wherein a separate portion of the separate portions includes a documentation link that, when selected, causes a view of documentation of the respective task to be presented on the display.

In Example 6, at least one of Examples 4-5 can further include, wherein a separate portion of the separate portions includes a code link that, when selected, causes a view of sample code of the respective task to be presented on the display.

In Example 7, at least one of Examples 1-6 can further include, wherein the checklist engine generates the checklist based on a flow graph of an application development and deployment process, wherein nodes of the flow graph represent tasks and arrows of the flow graph represent temporal relationships between the nodes.

In Example 8, Example 7 can further include, wherein the tasks are different for different types of applications.

Example 9 can include a system comprising a checklist database including checklist data stored thereon, a checklist engine to perform operations for guiding a user through a cloud application creation or deployment process using a development platform coupled to the memory, the checklist engine configured to receive, from the development platform, application data indicating a state of the cloud application, determining, based on the application data, that an item of a checklist of the checklist data has been completed, the checklist indicating tasks to be performed for configuring and securing the cloud application for deployment, storing data indicating the completed item is completed in the memory, and causing a view of the checklist, including an indication the completed item is completed, to be provided on a display.

In Example 10, Example 9 can further include, wherein the checklist indicates items to be performed (a) before testing the cloud application, (b) after testing the cloud application and before deploying the cloud application, or (c) after the cloud application is deployed.

In Example 11, at least one of Examples 9-10 can further include, wherein the application data includes an application object including data indicating one or more uniform resource locators (URLs), security data, permissions data, usage data, sign in data, session details data, or privileges data.

In Example 12, at least one of Examples 9-11 can further include, wherein the view of the checklist includes respective tasks in separate portions of the display.

In Example 13, Example 12 can further include, wherein a separate portion of the separate portions includes a documentation link that, when selected, causes a view of documentation of the respective task to be presented on the display.

In Example 14, at least one of Examples 12-13 can further include, wherein a separate portion of the separate portions includes a code link that, when selected, causes a view of sample code of the respective task to be presented on the display.

In Example 15, at least one of Examples 9-14 can further include, wherein the checklist engine generates the checklist based on a flow graph of an application development and deployment process, wherein nodes of the flow graph represent tasks and arrows of the flow graph represent temporal relationships between the nodes.

In Example 16, Example 1.5 can further include, wherein the tasks are different for different types of applications.

Example 17 can include a method for guiding a user through a cloud application creation or deployment process using a development platform, the method performed by a checklist engine, the method comprising receiving, from the development platform, application data indicating a state of the cloud application, determining, based on the application data, that an item of a checklist has been completed, the checklist indicating tasks to be performed for configuring and securing the cloud application for deployment, storing data indicating the completed item is completed in a checklist data database, and causing a view of the checklist to be provided on a display.

In Example 18, Example 17 can further include, wherein the checklist indicates items to be performed (a) before testing the cloud application, (b) after testing the cloud application and before deploying the cloud application, or (c) after the cloud application is deployed.

In Example 19, at least one of Examples 17-18 can further include, wherein the application data includes an application object including data indicating one or more uniform resource locators (URLs), security data, permissions data, usage data, sign in data, session details data, or privileges data.

In Example 20, at least one of Examples 17-19 can further include, wherein the view of the checklist includes respective tasks in separate portions of the display.

In Example 21, Example 20 can further include, wherein a separate portion of the separate portions includes a documentation link that, when selected, causes a view of documentation of the respective task to be presented on the display.

In Example 22, at least one of Examples 20-21 can further include, wherein a separate portion of the separate portions includes a code link that, when selected, causes a view of sample code of the respective task to be presented on the display.

In Example 23, at least one of Examples 17-22 can further include generating the checklist based on a flow graph of an application development and deployment process, wherein nodes of the flow graph represent tasks and arrows of the flow graph represent temporal relationships between the nodes.

In Example 24, Example 23 can further include, wherein the tasks are different for different types of applications.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A non-transitory machine-readable medium including instructions that, when executed by a checklist engine, cause the checklist engine to perform operations for guiding a developer through a cloud application deployment process using a development platform, the operations comprising:
   providing, by a user interface, first user-selectable controls defining an application type of application types of the cloud application, the application types including two or more of a single page app, web application programming interface (API), background process or automation, mobile application, web application, or desktop console application;
   responsive to receiving a user selection of a first user selectable control of the first user-selectable controls, providing a user with second user-selectable controls defining options for the cloud application;
   generating a checklist based on a flow graph of an application development and deployment process and based on the received user selection and a second selection of one or more of the second user-selectable controls, wherein nodes of the flow graph represent tasks and arrows of the flow graph represent temporal relationships between the nodes defining tasks of which nodes are to be completed before tasks of other nodes;
   receiving, from the development platform, application data of an application object data structure that defines the schema and properties of the cloud application, the application object indicating a state of the deployment of the cloud application, the application object including data indicating whether a uniform resource locators (URLs) is designated for accessing the cloud application, whether and which security protocols are defined for the cloud application after deployment, and whether and which permissions are defined for user access of the cloud application after deployment;
   without human interference with the application data of the application object, changing a state of an item of the checklist to indicate the item has been completed, the checklist indicating tasks to be performed for configuring and securing, before deployment, the cloud application from malicious actions after deployment;
   storing data indicating the completed item is completed in a checklist data database; and
   causing a view of the checklist to be provided on a display.

2. The medium of claim 1, wherein the checklist indicates items to be performed (a) before testing the cloud application, (b) after testing the cloud application and before deploying the cloud application, and (c) after the cloud application is deployed.

3. The medium of claim 1, wherein the application data includes an application object further includes data indicating usage data, sign in data, and session details data.

4. The medium of claim 1, wherein the view of the checklist includes respective tasks in separate portions of the display.

5. The medium of claim 4, wherein a separate portion of the separate portions includes a documentation link that, when selected, causes a view of documentation of the respective task to be presented on the display.

6. The medium of claim 4, wherein a separate portion of the separate portions includes a code link that, when selected, causes a view of sample code of the respective task to be presented on the display.

7. The medium of claim 1, wherein the tasks are different for different types of applications.

8. A system comprising:
a checklist database including checklist data stored thereon;
a checklist engine to perform operations for guiding a user through a cloud application deployment process using a development platform coupled to the memory,
the checklist engine including a processor configured to:
provide, by a user interface, first user-selectable controls defining an application type of application types of the cloud application, the application types including two or more of a single page app, web application programming interface (API), background process or automation, mobile application, web application, or desktop console application;
responsive to receiving a user selection of a first user selectable control of the first user-selectable controls, providing a user with second user-selectable controls defining options for the cloud application;
generate a checklist based on a flow graph of the application deployment process and based on the received user selection and a second selection of one or more of the second user-selectable controls, wherein nodes of the flow graph represent tasks and arrows of the flow graph represent temporal relationships between the nodes defining tasks of which nodes are to be completed before tasks of other nodes;
receive, from the development platform, application data of an application object data structure that defines the schema and properties of the cloud application, the application object indicating a state of the deployment of the cloud application, the application object including data indicating whether a uniform resource locators (URLs) is designated for accessing the cloud application, whether and which security protocols are defined for the cloud application after deployment, and whether and which permissions are defined for user access of the cloud application after deployment;
without human interference with the application data of the application object, changing a state of an item of the checklist of the checklist data to indicate the item has been completed, the checklist indicating tasks to be performed for configuring and securing, before deployment, the cloud application from malicious action after deployment;
storing data indicating the completed item is completed in the memory; and
causing a view of the checklist, including an indication the completed item is completed, to be provided on a display.

9. The system of claim 8, wherein the checklist indicates items to be performed (a) before testing the cloud application, (b) after testing the cloud application and before deploying the cloud application, and (c) after the cloud application is deployed.

10. The system of claim 8, wherein the application data includes an application object including further data indicating usage data, sign in data, and session details data.

11. The system of claim 8, wherein the view of the checklist includes respective tasks in separate portions of the display.

12. The system of claim 11, wherein a separate portion of the separate portions includes a documentation link that, when selected, causes a view of documentation of the respective task to be presented on the display.

13. The system of claim 11, wherein a separate portion of the separate portions includes a code link that, when selected, causes a view of sample code of the respective task to be presented on the display.

14. The medium of claim 8, wherein the tasks are different for different types of applications.

15. A method for guiding a user through a cloud application deployment process using a development platform, the method performed by a checklist engine, the method comprising:
providing, by a user interface, first user-selectable controls defining an application type of application types of the cloud application, the application types including two or more of a single page app, web application programming interface (API), background process or automation, mobile application, web application, or desktop console application;
responsive to receiving a user selection of a first user selectable control of the first user-selectable controls, providing a user with second user-selectable controls defining options for the cloud application;
generating a checklist based on a flow graph of an application deployment process and based on the received user selection and a second selection of one or more of the second user-selectable controls, wherein nodes of the flow graph represent tasks and arrows of the flow graph represent temporal relationships between the nodes defining tasks of which nodes are to be completed before tasks of other nodes;
receiving, from the development platform, application data of an application object data structure that defines the schema and properties of the cloud application, the application object indicating a state of the deployment of the cloud application, the application object including data indicating whether a uniform resource locators (URLs) is designated for accessing the cloud application, whether and which security protocols are defined for the cloud application after deployment, and whether and which permissions are defined for user access of the cloud application after deployment;
without human interference with the application data of the application object, changing a state of a state of an item of the checklist to indicate the item has been completed, the checklist indicating tasks to be performed for configuring and securing, before deployment, the cloud application from malicious actions after deployment;
storing data indicating the completed item is completed in a checklist data database; and
causing a view of the checklist to be provided on a display.

16. The method of claim 15, wherein the checklist indicates items to be performed (a) before testing the cloud application, (b) after testing the cloud application and before deploying the cloud application, and (c) after the cloud application is deployed.

17. The method of claim 15, wherein the application data includes an application object including data indicating usage data, sign in data, and session details data.

18. The method of claim 15, wherein the view of the checklist includes respective tasks in separate portions of the display.

* * * * *